US012676517B2

(12) United States Patent
Lehmann et al.

(10) Patent No.: US 12,676,517 B2
(45) Date of Patent: Jul. 7, 2026

(54) METHOD FOR MOUNTING A DECOUPLING ELEMENT IN A THROUGH-HOLE IN A STATOR OF AN ELECTRIC MACHINE, STATOR FOR AN ELECTRIC MACHINE, AND ELECTRIC MACHINE COMPRISING A STATOR OF THIS TYPE

(71) Applicant: Schaeffler Technologies AG & Co. KG, Herzogenaurach (DE)

(72) Inventors: Steffen Lehmann, Ettlingen (DE); Marc Helfer, Ottrott (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 237 days.

(21) Appl. No.: 18/710,708

(22) PCT Filed: Nov. 3, 2022

(86) PCT No.: PCT/DE2022/100809
§ 371 (c)(1),
(2) Date: May 16, 2024

(87) PCT Pub. No.: WO2023/088514
PCT Pub. Date: May 25, 2023

(65) Prior Publication Data
US 2025/0023402 A1 Jan. 16, 2025

(30) Foreign Application Priority Data
Nov. 18, 2021 (DE) ..................... 10 2021 130 130.0

(51) Int. Cl.
*H02K 1/18* (2006.01)
*H02K 15/028* (2025.01)

(52) U.S. Cl.
CPC .......... *H02K 1/185* (2013.01); *H02K 15/028* (2013.01)

(58) Field of Classification Search
CPC ........................... H02K 1/185; H02K 15/028
See application file for complete search history.

(56) References Cited

U.S. PATENT DOCUMENTS

2015/0130311 A1    5/2015  Murakami et al.
2018/0358848 A1*  12/2018  Inoue ...................... H02K 5/24
2019/0229576 A1    7/2019  Miura et al.

FOREIGN PATENT DOCUMENTS

DE            2748419  A1    6/1978
DE     102018114790  A1 * 12/2019  ............. H02K 7/006
(Continued)

OTHER PUBLICATIONS

English Translation of DE-102018114790-A1. (Year: 2018).*

*Primary Examiner* — Sean Gugger
(74) *Attorney, Agent, or Firm* — Price Heneveld LLP

(57) ABSTRACT

The disclosure relates to a method for mounting a decoupling element in a through-hole in a stator of an electric machine. The decoupling element comprises a sleeve and an elastic sheath, which is fastened to the sleeve and surrounds the sleeve and is made of a damping material. In the mounted position, the stator is vibrationally decoupled from a housing of the electric machine by means of said damping material. The decoupling element, the elastic sheath of which has an outside diameter greater than the inside diameter of the through-hole, is pressed into the through-hole through an insertion opening, which expands in the manner of a funnel. In the mounted position, the decoupling element is seated directly against the inside wall of the through-hole.

12 Claims, 3 Drawing Sheets

(56)        References Cited

FOREIGN PATENT DOCUMENTS

| | | | |
|---|---|---|---|
| DE | 102019217412 | A1 | 5/2020 |
| DE | 102019209672 | A1 | 1/2021 |
| JP | 2008199845 | A | 8/2008 |
| JP | 2018046666 | A | 3/2018 |

* cited by examiner

METHOD FOR MOUNTING A DECOUPLING ELEMENT IN A THROUGH-HOLE IN A STATOR OF AN ELECTRIC MACHINE, STATOR FOR AN ELECTRIC MACHINE, AND ELECTRIC MACHINE COMPRISING A STATOR OF THIS TYPE

CROSS-REFERENCE TO RELATED APPLICATIONS

This application is a U.S. national stage application under 35 U.S.C. § 371 that claims the benefit of priority under 35 U.S.C. § 365 of International Patent Application No. PCT/DE2022/100809, filed on Nov. 3, 2022, designating the United States of America, which in turn claims the benefit of priority under 35 U.S.C. §§ 119, 365 of German Patent Application No. 102021130130.0, filed Nov. 18, 2021, the contents of which are relied upon and incorporated herein by reference in their entirety.

FIELD OF THE DISCLOSURE

The disclosure relates to a method for mounting a decoupling element in a through-hole of a stator of an electric machine, wherein the decoupling element has a sleeve and an elastic sheath which is fastened to the sleeve, surrounds the sleeve, and which is made of a damping material, via which the stator in the mounted position is vibrationally decoupled from a housing of the electric machine.

BACKGROUND OF THE DISCLOSURE

An electric machine comprising a stator, which is vibrationally decoupled from the housing of the electric machine via a plurality of such decoupling elements, is described, for example, in DE 10 2018 114 790 A1. The stator itself is provided with a plurality of through-holes, into each of which a decoupling element is inserted. The decoupling element has an inner cylindrical sleeve, which, on the one hand, is supported axially on the housing of the electric machine when the stator is mounted, and on which, on the other hand, a head of a fastening screw sits, which engages through the sleeve and is screwed into a corresponding internally threaded hole on the housing. This cylindrical inner sleeve is surrounded by an elastic sheath made of a damping material, which in turn is accommodated in a cylindrical outer sleeve. This 3-part decoupling element is pressed into the stator-side hole with the outer sleeve, after which the two ends of the outer sleeve are flanged so that a radial collar is created, via which the axial locking on the stator takes place. The stator itself is connected to the housing via the screw connection, but this mechanical fastening is vibrationally decoupled via the elastic sheath made of the damping material, which means that high-frequency vibrations of the stator are not transmitted into the housing, or are only transmitted to a significantly reduced extent, or are emitted with a reduced amplitude.

The mounting or design of such a decoupling element is very complex. The outer sleeve and the inner sleeve must be inserted into a corresponding tool and positioned relative to one another, after which the elastic damping material is introduced between both sleeves and, for example, vulcanized. This forms the corresponding 3-part decoupling element, which, however, still requires complex reworking. The outside diameter of the outer sleeve must correspond as precisely as possible to the inside diameter of the stator hole so that there is as little play as possible. This play must ultimately be reduced to zero through the subsequent flanging, which also serves as axial locking. Both production and mounting are therefore complex.

SUMMARY OF THE DISCLOSURE

The disclosure addresses the problem by specifying a method for mounting a decoupling element which is improved in comparison.

In a method of the present disclosure, the decoupling element, the elastic sheath of which has a larger outside diameter than the inside diameter of the through-hole, is pressed into the through-hole through an insertion opening that widens in a funnel-like manner and, in the mounted position, rests directly against the inside wall of the through-hole.

In the method, a 2-part decoupling element is used, comprising the cylindrical inner sleeve and the likewise cylindrical sheath which is fastened to it, surrounds it, and is made of the elastic damping material. The outside diameter of the sheath is larger than the inside diameter of the through-hole, which means that there is a corresponding overlap or oversized portion. When the decoupling element is inserted into the through-hole and the elastic damping material rests against the inside wall of the through-hole, this inevitably has the result that the damping material is compressed radially and, consequently, a correspondingly firm clamping coupling is provided.

In order to be able to insert the decoupling element, which as mentioned has an outside diameter larger than the inner diameter of the hole, into the through-hole, the decoupling element is pressed into the through-hole through an insertion opening that widens outwards in a funnel-like manner or that narrows in a funnel-like manner towards the through-hole and is pushed into the mounted position, in which, after completion of the mounting work, the elastic sheath rests against the inside wall of the hole with corresponding radial preload. If the stator is then mounted, the fastening screw is guided through the inner sleeve and screwed into the internally threaded hole on the housing side, wherein the inner sleeve, which preferably protrudes axially from the stator, is simultaneously also pressed into the hole on the housing side.

The decoupling element is designed to be simpler since it consists only of the inner sleeve and the sheath, which is fastened thereto and, for example, vulcanized thereon. Mounting is also simplified because the decoupling element can be pressed into the through-hole through the funnel-like insertion opening, and any flanging processes or the like are not necessary.

The through-holes can be provided at different positions or on different elements of the stator. It is conceivable to form the through-holes directly in a stator laminated core, which consists of a large number of individual, thin electrical sheets. Alternatively, such a stator laminated core can also be arranged in a stator carrier, with the through-holes then being formed on the stator carrier.

If the through-holes are provided directly in a stator laminated core, then according to a corresponding alternative of the disclosure, a mounting sleeve, which has the insertion opening that widens in a funnel-like manner, is first inserted into the through-hole, after which the decoupling element is pressed through the insertion opening into the mounting sleeve and thus into the through-hole, after which the mounting sleeve is drawn out of the through-hole and the elastic sheath rests against the inside wall of the through-hole. As described, such a stator laminated core consists of a large number of thin electrical sheets placed one on top of the other. For example, around 80 such electrical sheets are stacked on top of each other, each with a thickness of approximately 0.3 mm. Since every electrical sheet is punched with a mostly round perforation, with the perforations then complementing each other to form the through-hole, there may be small but sharp edges or the like on the inside wall of the hole, as well as at the entrance to the hole. If the elastic sheath were to be pressed in immediately, these sharp edges would cut into the sheath and, in the worst case, destroy it. This is counteracted by first inserting a thin mounting sleeve, for example with a wall thickness of 0.3-1.0 mm, into the feedthrough hole. The mounting sleeve has a section positioned outside the through-hole with the funnel-like insertion opening. The decoupling element is now first pressed into the mounting sleeve via this insertion opening until the end position is reached. The mounting sleeve is then drawn out of the through-hole again, while naturally the decoupling element is supported so that it is not withdrawn with it. After removal of the mounting sleeve, the elastic sheath then rests in a radially preloaded manner against the inside wall of the hole.

The mounting sleeve can have a cylindrical sleeve body and an adjoining stop collar with a widened outside diameter, on which the insertion opening, which widens in a funnel-like manner, is provided, wherein the sleeve body is inserted into the through-hole with little play until the stop collar sits axially on the stator laminated core, after which the decoupling element is pressed in. This stop collar allows the mounting sleeve to be reversibly brought into a defined mounting position. In addition, this stop collar also serves to couple the mounting sleeve with a corresponding tool, via which the mounting sleeve can be drawn out of the through-hole at least after the decoupling element has been set. The stop collar should therefore be designed to be correspondingly stable and be equipped with a corresponding connection interface to the drawing tool.

Alternatively, as stated, the stator can also have a stator carrier on which the stator laminated core is arranged. In this case, the through-holes are provided on the stator carrier, on which the insertion opening which widens in a funnel-like manner is provided. Here, the funnel-like insertion opening is formed directly on the stator carrier itself in an extension of the actual through-hole that accommodates the elastic sheath. In this case, the use of a mounting sleeve is not necessary since the stator carrier itself is already equipped with the corresponding insertion opening.

According to a particularly useful development of the disclosure, a lubricating fluid is used during pressing-in. Regardless of whether an insertion sleeve is used when the through-holes are formed in the stator laminated core itself, or if a stator carrier is used, the pressing-in takes place using an appropriate lubricating fluid that reduces the friction between the elastic damping material and the cylindrical inside wall along which it slides during the pressing process. It is possible for the elastic damping material, for example rubber, to have a correspondingly high coefficient of friction, such that it would be difficult to slide along the corresponding cylindrical wall, particularly due to the given oversized portion. However, if a lubricating fluid is used, the friction between the damping material and the wall can be greatly reduced, making the pressing-in much easier. The lubricating fluid can be applied either to the outer side of the sheath, or to the corresponding wall, i.e., the mounting sleeve or the hole wall itself, or to both. It is conceivable to use either an oil or a corresponding pasty grease or the like.

In addition to the method itself, the disclosure also relates to a stator for an electric machine, comprising a plurality of through-holes, in each of which a decoupling element is inserted according to the method described above.

In addition, the disclosure relates in general to a stator for an electric machine, comprising a plurality of through-holes, into which a fastening screw connecting the stator to a housing of the electric machine is to be inserted, wherein a decoupling element is accommodated in each through-hole, comprising a sleeve, which in the mounted position is supported axially on the housing on the one hand and on which a head of the fastening screw is supported on the other hand, and a sheath which surrounds the sleeve and which is made of an elastic material, via which the stator, in the mounted position, is vibrationally decoupled from the housing, wherein said stator is characterized in that the elastic material rests directly against the inside wall of the through-hole.

Each through-hole can be formed on the one hand in a stator laminated core, in a manner passing through its laminations. Alternatively, each through-hole can also be formed on a stator carrier on which the insertion opening is formed.

For all embodiments, the damping material itself is preferably an elastomer, in particular with a Shore hardness in the range of 60 Sh(a)-100 Sh(a). The resilience or damping effect of the elastic material ultimately depends on the Shore hardness of the material as well as the degree of compression, which is why the oversized portion in diameter must be designed such that the compression of the elastic material and thus its radial preload, on the one hand, is in a desired target range and, on the other hand, however, is so high that a secure axial fixation takes place thereby.

Finally, the disclosure also relates to an electric machine, comprising a stator of the type described above, which is fastened to a housing of the electric machine via fastening screws passing through the sleeve of the decoupling element.

BRIEF DESCRIPTION OF THE DRAWINGS

The disclosure is explained below on the basis of exemplary embodiments with reference to the drawings. The drawings are schematic representations, in which.

DETAILED DESCRIPTION

Figure 1:
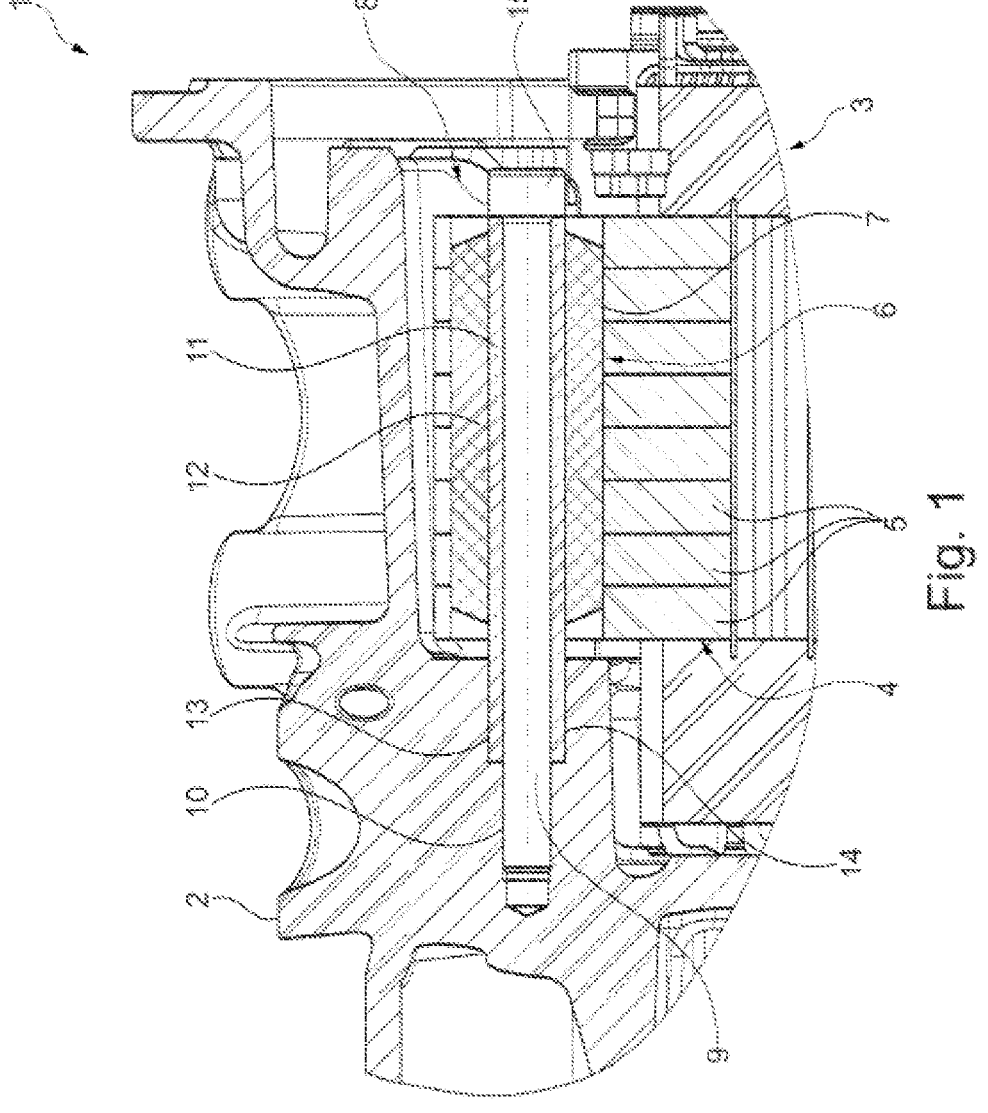
FIG. 1 shows a partial view of an electric machine according to the disclosure with a stator according to the disclosure in a sectional view, according to a first embodiment as a schematic diagram.

FIG. 1 shows a partial view of an electric machine 1 according to the disclosure, comprising a housing 2, to which a stator 3 is fastened. The stator 3 consists of a stator laminated core 4, which consists of a large number of individual electrical sheets 5 layered on top of each other, which are only shown in principle here. A plurality of through-holes 6 are formed in the laminated core 4, which are offset around the circumference of the stator 3, with only one such through-hole 6 being shown in FIG. 1. The through-hole 6 has an inside wall 7.

A decoupling element 8 (i.e., dampening element 8) and a fastening screw 9 are used to fasten the stator 3 to the housing 2 and to simultaneously decouple (i.e., dampen) vibrations, the fastening screw being screwed into the internally threaded hole 10 of the housing 2 and secondly fixing the decoupling element 8 to the housing 2 in the process.

The decoupling element 8 has an inner cylindrical sleeve 11, which is surrounded on the outside by an elastic sheath 12 on a damping material, preferably an elastomer with a Shore hardness between 60-100 Sh(a). The damping material is preferably vulcanized. The sheath 12 extends axially over approximately ⅔ of the length of the inner sleeve 11, which means that the sleeve 11 projects axially beyond the sheath 12. In the mounted position, as shown in FIG. 1, the sleeve 11 engages with its end 13 in a radial extension 14 of the internally threaded hole 10, the sleeve 11 being pressed into this extension 14 when the fastening screw 9 is screwed in after the screw head 15 rests axially against the sleeve 11 and presses it in axially. The elastic sheath 12 in turn rests against the inside wall 7 of the through-hole 6 under radial preload, the radial preload being generated by a corresponding diameter overlap or an oversized portion of the outside diameter of the sheath 12 relative to the smaller inside diameter of the through-hole 6. This radial compression, with which the elastic damping material is compressed radially, also ensures axial locking.

In order to be able to position the decoupling element 8 with its sleeve 11 and the sheath 12 in the through-hole 6, a separate mounting sleeve is used in this stator 3 during the pressing-in process into the through-hole 6, which mounting sleeve is subsequently removed. Since, as described, the through-hole 6 is formed directly in the stator laminated core 4, which consists of the large number of individual electrical sheets 5, of which, for example, up to 80 or more can be layered and which have a thickness of approximately 0.3 mm, there are small but sharp burrs, on the one hand, at the entrance to the through-hole 6 and, on the other hand, possibly also within the through-hole 6, which can cut into the elastic damping material when pressed in and, in the worst case, destroy it.

Figures 2, 3, 4, 5:
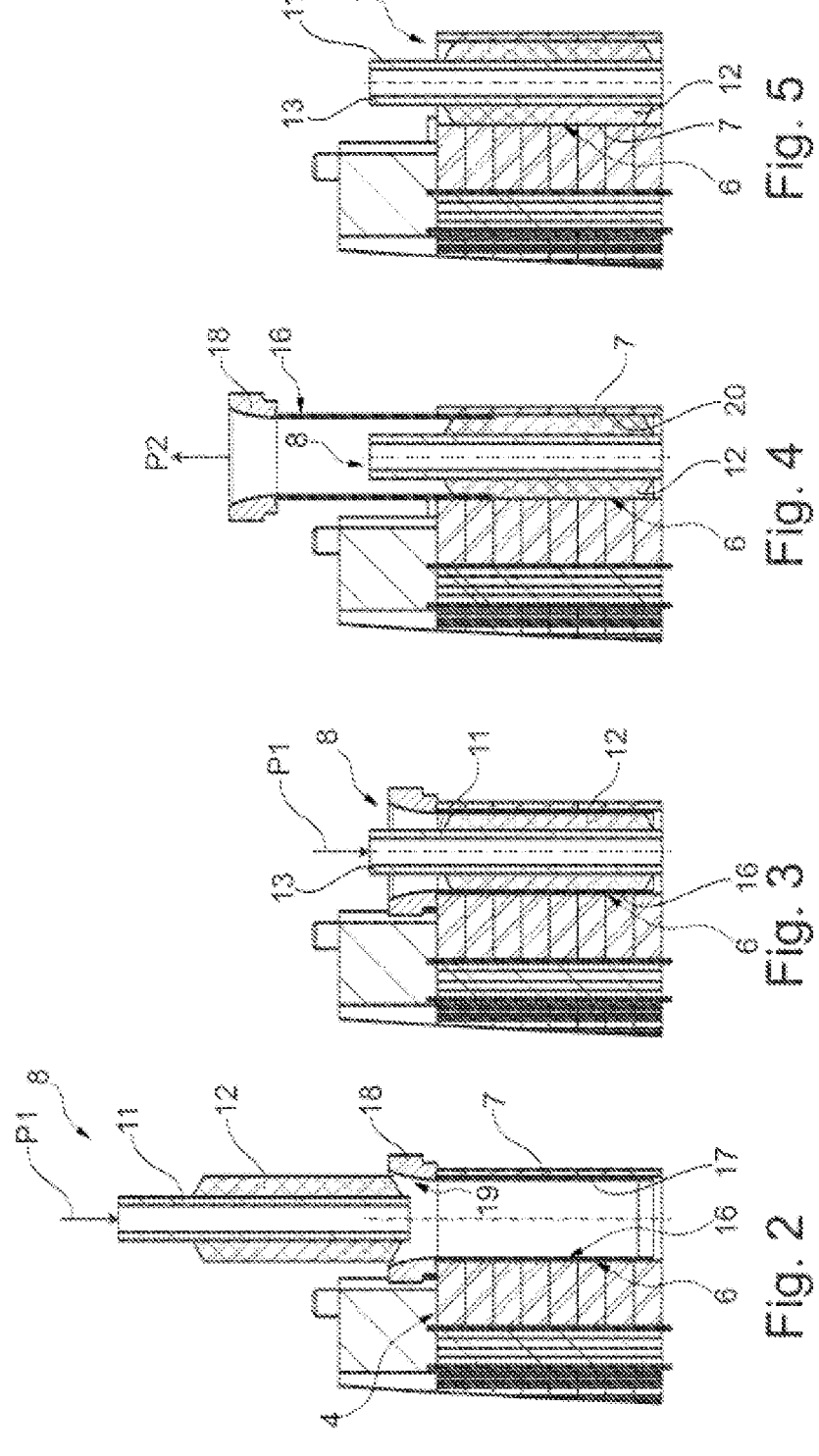
FIGS. 2-5 show continuous partial views of a stator according to the disclosure to show the mounting process of a decoupling element using a mounting sleeve, each in a sectional view.

The mounting method is shown in FIGS. 2-5. FIG. 2 shows the situation in which the decoupling element 8 has not yet been inserted. The decoupling element 8 is a pre-fabricated element with the sleeve 11 and the elastic sheath 12 fastened, for example vulcanized, thereto. A mounting sleeve 16 is inserted into the through-hole 6 and has a cylindrical sleeve body 17, to which a radially widened stop collar 18 is connected, which at the same time is also used to hold a corresponding drawing tool for subsequently withdrawing the mounting sleeve 16. In the situation shown in FIG. 1, the sleeve body 17 is inserted into the through-hole 6, and the stop collar 18 sits axially on the laminated core 4. The mounting sleeve 16 is thin and preferably has a thickness of 0.3-1.0 mm so that the damping material is not compressed too much when pressed in. The outside diameter of the mounting sleeve 16 is dimensioned such that the mounting sleeve 16 has very little play in the through-hole 6.

As FIG. 2 shows, the mounting sleeve 16 or the stop collar 18 has an insertion opening 19 that widens outwards in a funnel-like manner, which means that the inside diameter of the stop collar 18 widens towards its free end. This makes it possible to press in the sheath 12, the outside diameter of which is obviously slightly larger than the inside diameter of the inside wall 7 of the through-hole 6, in a simple manner while reducing the diameter. For this purpose, a lubricating fluid is expediently used, with which, for example, the outer side of the sheath 12 is coated, which lubricating fluid reduces the friction between the outer side of the sheath 12 and the inner side of the mounting sleeve 16, so that both friction partners can slide well along each other until the decoupling element 8 is in the end position.

FIG. 3 shows the situation in which the decoupling element 8 is pressed into the through-hole 6 or into the mounting sleeve 16. The pressing process is shown in FIGS. 2 and 3 by the arrow P1. The decoupling element 8 is moved until the sheath 12 is completely accommodated in the through-hole 6 or the mounting sleeve 16. As can be seen, the end 13 of the inner sleeve 11 protrudes axially and projects from the through-hole 6.

In the next step, see FIG. 4, the mounting sleeve 16 is withdrawn from the through-hole 6, as arrow P2 shows, using a corresponding drawing tool that engages the stop collar 18. At the same time, the decoupling element 8 is naturally held down and fixed so that it is not withdrawn again when the mounting sleeve 16 is pulled. The lubricating fluid also means that the withdrawing takes place with relatively little friction.

By withdrawing the mounting sleeve 16, the sheath 12 rests with its outer side 20 firmly against the inside wall 7 of the through-hole 6, such that radial preload or pressing occurs.

FIG. 5 finally shows the finished end position of the mounted decoupling element 8, in which the elastic sheath 12 rests directly against the inside wall 7 of the through-hole 6. The free end 13 of the sleeve 11 projects axially from the through-hole 6, such that it can be pressed into the radial extension 14 of the internally threaded hole 10 by means of the fastening screw 9 during fastening of the stator 3.

Figure 6:
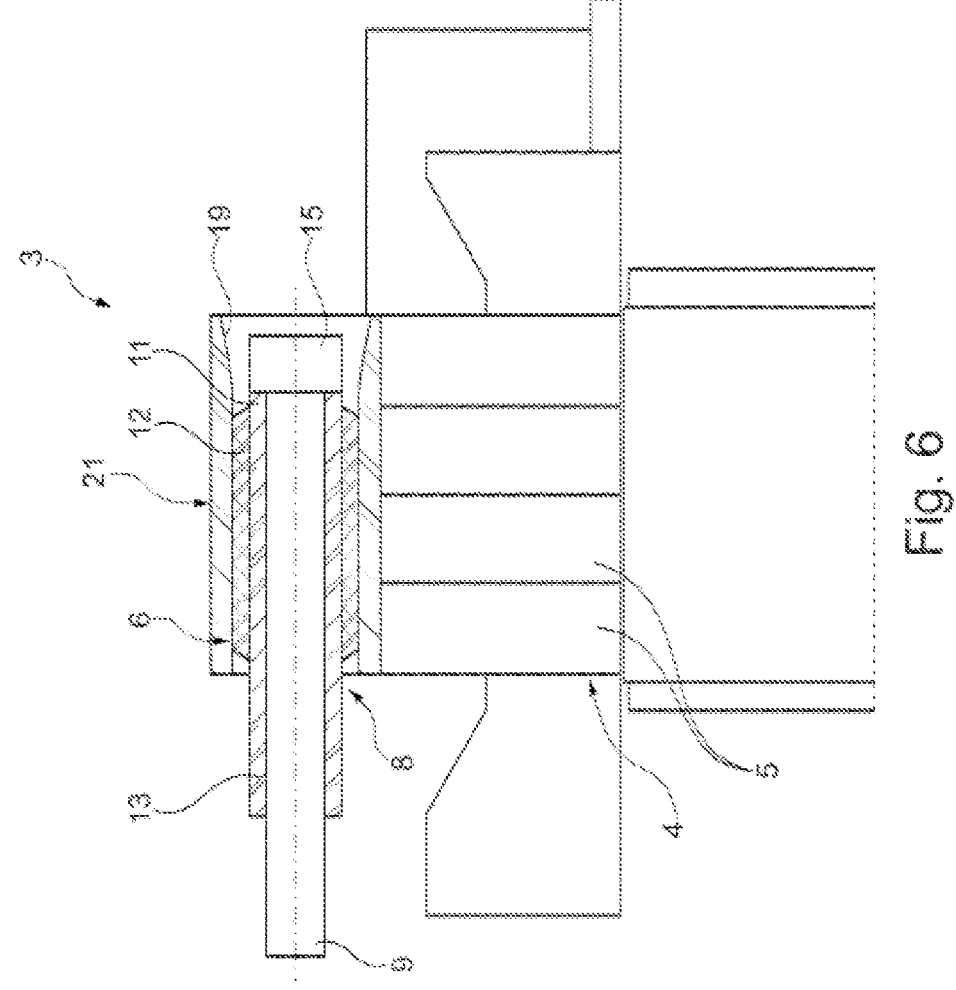
FIG. 6 shows a schematic representation of a stator, according to the disclosure, of a second embodiment in a sectional view.

FIG. 6 shows a further embodiment of a stator 3 according to the disclosure, which can also be part of an electric machine 1 according to the disclosure instead of the stator 3 shown in the above figures. In this case, the stator 3 has a stator carrier 21 on which the through-holes 6 are formed. The laminated core 4, consisting of a large number of individual electrical sheets 5, is arranged on the stator carrier 21.

Since the through-holes 6 are formed here on the stator carrier 21, but not in the laminated core 4 itself, it is possible to form a corresponding insertion geometry directly on the stator carrier 21 itself, as shown in FIG. 6. As can be seen, the through-hole 6 itself has an insertion opening 19 which widens in a funnel-like manner, through which the decoupling element 8, again consisting of the sleeve 11 and the elastic sheath 12, can be inserted, during which press-in movement the elastic sheath 12 is automatically reduced in diameter and compressed until it is pushed into the end position shown in FIG. 6. This pressing-in takes place again using a corresponding lubricating fluid, for example an oil or a grease. In this case also, the free end 13 of the sleeve 11 projects from the through-hole 6 or from the stator carrier 21, such that it can be pressed into the radial extension 14 of the internally threaded hole 10 in the same way as already described above. The fastening screw 9 is positioned in the same way so that it can be screwed into the internally threaded hole 10 and at the same time the sleeve end 13 is pressed in while the screw head 15 sits axially on the other end of the sleeve 11. The through-holes 6, which can also be referred to as eyes, are formed either on correspondingly shaped sections of the stator carrier 21, or by means of sections correspondingly welded on the stator carrier.

LIST OF REFERENCE SIGNS

1 Electric machine
2 Housing
3 Stator
4 Stator laminated core
5 Electrical sheets
6 Through-hole
7 Inside wall
8 Decoupling element
9 Fastening screw
10 Internally threaded hole
11 Sleeve
12 Sheath
13 Sleeve end
14 Radial extension
15 Screw head
16 Mounting sleeve
17 Cylindrical sleeve body
18 Stop collar
19 Insertion opening
20 Outer side
21 Stator carrier
P1 Pressing process
P2 Withdrawal of mounting sleeve

The invention claimed is:

1. A method for mounting a decoupling element in a through-hole of a stator of an electric machine, wherein the decoupling element has a sleeve and an elastic sheath which is fastened to the sleeve, surrounds the sleeve, and which is made of a damping material, via which the stator in a mounted position is vibrationally decoupled from a housing of the electric machine, comprising the step of:

pressing the decoupling element into the through-hole through an insertion opening that narrows in a funnel-like manner as the insertion opening extends toward the through-hole, wherein the elastic sheath of the decoupling element has a larger outside diameter than an inside diameter of the through-hole, and wherein the decoupling element rests directly against an inside wall of the through-hole in the mounted position.

2. The method of claim 1, further comprising the steps of:

inserting a mounting sleeve that includes the insertion opening into the through-hole that is formed in a stator laminated core prior to the step of pressing the decoupling element into the through-hole; and drawing the mounting sleeve out of the through-hole after the step of pressing the decoupling element into the through-hole, such that the elastic sheath rests against the inside wall of the through-hole.

3. The method of claim 2, wherein the mounting sleeve has a cylindrical sleeve body and an adjoining stop collar which is widened in the outside diameter and on which the insertion opening is provided, and wherein the sleeve body is inserted into the through-hole until the stop collar sits axially on the stator laminated core, after which the decoupling element is pressed in.

4. The method of claim 1, wherein the stator includes a stator carrier and a stator laminated core arranged on the stator carrier, and the through-hole and insertion opening are provided on the stator carrier.

5. The method of claim 1, further comprising the step of:

applying a lubricating fluid to the decoupling element during the step of pressing the decoupling element into the through-hole.

6. A stator for an electric machine, comprising:

a plurality of through-holes, each configured to receive a fastening screw for connecting the stator to a housing therein in a mounted position of the stator; and a corresponding plurality of decoupling elements accommodated in the plurality of through-holes, each of the plurality of decoupling elements comprising:

a sleeve that, in the mounted position of the stator, is supported axially on the housing and on which a head of the fastening screw is supported opposite the housing; and a sheath which surrounds the sleeve and which is made of an elastic material, wherein, in the mounted position of the stator, the stator is vibrationally decoupled from the housing via the sheath and the elastic material of the sheath rests directly against an inside wall of the through-hole.

7. The stator of claim 6, wherein each through-hole is formed in one of a stator laminated core of the stator in a manner passing through individual sheets thereof, and a stator carrier of the stator on which an insertion opening is formed.

8. The stator of claim 6, wherein the elastic material is an elastomer with a Shore hardness in the range of 60 Sh(a)-100 Sh(a).

9. An electric machine, comprising:

a housing that includes a plurality of internally threaded holes;

a stator that includes a corresponding plurality of through-holes that are respectively aligned with the plurality of internally threaded holes;

a plurality of dampening elements respectively accommodated in the plurality of through-holes of the stator, each of the dampening elements comprising:

a sleeve that includes a first axial end that abuts the housing and a second axial end opposite the first axial end; and a sheath that extends about the sleeve, the sheath being formed of elastic material; and a corresponding plurality of fasteners extending respectively within the sleeves of the plurality of dampening elements through the corresponding through-holes of the stator and into the internally threaded holes of the housing to mount the stator to the housing, each having a head that abuts the second axial end of the sleeve of the corresponding dampening element, wherein the elastic material of each sheath extends between the sleeve and the corresponding through-hole and rests directly against an inside wall of the through-hole, such that vibrations from the housing are dampened by the elastic material before reaching the stator.

10. The electric machine of claim 9, wherein the stator includes a stator laminated core, and each of the plurality of through-holes are formed in the stator laminated core.

11. The electric machine of claim 9, wherein the stator includes a stator carrier, and each of the plurality of through-holes are formed in the stator carrier.

12. The electric machine of claim 9, wherein the elastic material is an elastomer with a Shore hardness in the range of 60 Sh(a)-100 Sh(a).

* * * * *